(12) United States Patent
Brush et al.

(10) Patent No.: US 12,122,866 B2
(45) Date of Patent: Oct. 22, 2024

(54) REACTION PRODUCTS OF DIGLYCIDYL ETHERS WITH DIFUNCTIONAL ACTIVE HYDROGEN CONTAINING AND HYDROPHOBIC COMPONENTS

(71) Applicant: HERCULES LLC, Wilmington, DE (US)

(72) Inventors: Kelly Anne Brush, Newark, DE (US); Venkataram Krishnan, Avondale, PA (US); Grzegory Stoklosa, Sewell, NJ (US); Zeena Kottukapally Cherian, Exton, PA (US)

(73) Assignee: HERCULES LLC, Wilmington, DE (US)

( * ) Notice: Subject to any disclaimer, the term of this patent is extended or adjusted under 35 U.S.C. 154(b) by 335 days.

(21) Appl. No.: 17/272,156

(22) PCT Filed: Aug. 28, 2019

(86) PCT No.: PCT/US2019/048495
§ 371 (c)(1),
(2) Date: Feb. 26, 2021

(87) PCT Pub. No.: WO2020/047047
PCT Pub. Date: Mar. 5, 2020

(65) Prior Publication Data
US 2021/0253769 A1    Aug. 19, 2021

Related U.S. Application Data

(60) Provisional application No. 62/723,868, filed on Aug. 28, 2018.

(51) Int. Cl.
*C08F 283/06* (2006.01)
*C09D 171/00* (2006.01)

(52) U.S. Cl.
CPC .......... *C08F 283/06* (2013.01); *C09D 171/00* (2013.01)

(58) Field of Classification Search
None
See application file for complete search history.

(56) References Cited

U.S. PATENT DOCUMENTS

| | | |
|---|---|---|
| 4,315,044 A | 2/1982 | Elmore et al. |
| 2016/0024295 A1 | 1/2016 | Karunakaran et al. |
| 2016/0177125 A1 | 6/2016 | Flosser et al. |
| 2016/0194297 A1 | 7/2016 | Karl et al. |

FOREIGN PATENT DOCUMENTS

| | | | |
|---|---|---|---|
| CA | 2599578 C | * | 6/2014 |
| WO | WO 2012/080264 A1 | * | 6/2012 |

OTHER PUBLICATIONS

References cited in the International Search Report of International Application No. PCT/US19/48495, Nov. 2019.

* cited by examiner

*Primary Examiner* — Tae H Yoon
(74) *Attorney, Agent, or Firm* — William J. Davis; Nathalie Tietcheu (57) ABSTRACT

A reaction product derived from a reactant comprising a diglycidyl ether component, a difunctional active hydrogen containing component and a hydrophobic component is disclosed. Additionally, the present disclosure relates generally to compositions comprising the reaction products and applications thereof in various industrial areas such as coatings.

23 Claims, 2 Drawing Sheets

Figure 1

Figure 2

REACTION PRODUCTS OF DIGLYCIDYL ETHERS WITH DIFUNCTIONAL ACTIVE HYDROGEN CONTAINING AND HYDROPHOBIC COMPONENTS

CROSS-REFERENCE TO RELATED APPLICATIONS

This application is a U.S. National Phase filing under 35 U.S.C. § 371 of International Application No. PCT/US2019/048495 filed Aug. 28, 2019, which claims benefit of priority U.S. Provisional Patent Application No. 62/723,868 filed Aug. 28, 2018. The entire disclosures of which are hereby incorporated in their entirety.

BACKGROUND

Field

The presently disclosed process(es), procedure(s), method(s), product(s), result(s), and/or concept(s) (collectively referred to hereinafter as the "present disclosure") relates generally to a reaction product derived from a reactant comprising a diglycidyl ether component, a difunctional active hydrogen containing component and a hydrophobic component; and a method for preparing the reaction product. Additionally, the present disclosure relates generally to compositions comprising the reaction products and applications thereof in various industrial areas such as coatings.

Background

Water-soluble polymers (also commonly referred to as "thickeners" or "rheology modifiers") are widely used in many industrial water-borne systems as additives to modify their flow behavior. Thickeners increase and maintain viscosity at required levels under specified processing conditions and end use situations. Thickeners are useful, for example, in decorative and protective coatings, paper coatings, cosmetics and personal care products, detergents, pharmaceuticals, adhesives and sealants, agricultural formulations, and petroleum drilling fluids.

Thickeners can be natural products, directly derived from natural products, or synthetically manufactured. Natural thickeners, for example, can include casein, alginates, gum tragacanthins, guar, xanthan gum, locust and bean gum. Typical examples of naturally derived thickeners can include cellulose ethers derived from cellulosics, such as hydroxyethyl cellulose (HEC), hydroxypropyl cellulose (HPC), and carboxymethyl cellulose (CMC). These natural and naturally derived products (hereinafter called "natural products") vary in their thickening efficiency. One of the drawbacks of the natural products is that they are subject to microbial attack and hence, addition of antimicrobial agents to the formulation is required. Synthetic thickeners include various acrylic polymers, alkylene oxide polymers, amide polymers, and maleic anhydride polymers. These synthetic thickeners can be either homopolymers or copolymers. The hydrolytic stability of some polymers depends on the pH of the solution and others are sensitive to various components normally found in aqueous coatings.

In recent years, synthetic associative thickeners have increased in importance, particularly in controlling the rheology of waterborne coatings and latex paints. Since synthetic associative thickeners are prepared from basic chemicals, they can be prepared with certain properties in mind. In other words, synthetic associative thickeners can be tailored for desired and/or targeted properties from the ground up. Synthetic associative thickeners serve several roles in aqueous systems. For instance, in latex paints and waterborne coatings, the thickener can provide improved stability and pigment suspension, as well as improved rheological and application properties.

Typically in coating applications, a small amount (about 0.1-5.0 wt %) of water-soluble polymer is added into latex paint to achieve the following performance characteristics during manufacturing, storage, and applications: a) ease of formulation, b) prevention of settling of the suspended particles (latex, pigment, etc.) during storage, c) good film build during application to achieve efficient hiding without excessive brush or roller drag, d) good roller spatter resistance, e) no excessive sagging after application on a vertical surface, and f) good flow and leveling for the formation of a smooth and continuous film with good appearance.

The above mentioned natural and synthetic thickeners can provide different degrees of thickening efficiency and application properties. However, they invariably fail to provide all the key performance properties in paints. These key properties include good film build, flow and leveling, and gloss which are generally offered by solvent-based alkyd paints. Another drawback of these thickeners is that they may have poor compatibility with the various paint ingredients.

A need in the art remains, therefore, for a synthetic associative thickener that can provide flexibility in synthesis for targeting the specific properties and satisfies a wide range of rheology requirements for paints.

DETAILED DESCRIPTION

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

The term "alkyl" refers to a saturated linear or branched hydrocarbon group of 1 to 50 carbons The term "alkylene" as used herein refers to an unsaturated, linear or branched hydrocarbon group of 1 to 50 carbon atoms with one or more carbon-carbon double bonds.

The term "aryl" refers to a mono- or polynuclear aromatic hydrocarbon group including carbocyclic and heterocyclic aromatic groups.

The term "monomer" refers to a small molecule that chemically bonds during polymerization to one or more monomers of the same or different kind to form a polymer.

The term "polymer" refers to a large molecule comprising one or more types of monomer residues (repeating units) connected by covalent chemical bonds. By this definition, polymer encompasses compounds wherein the number of monomer units may range from very few, which more commonly may be called as oligomers, to very many. Non-limiting examples of polymers include homopolymers, and non-homopolymers such as copolymers, terpolymers, tetrapolymers and the higher analogues.

The term "moiety" refers to a part or a functional group of a molecule.

All percentages, ratio, and proportions used herein are based on a weight basis unless other specified.

The present disclosure is directed to a reaction product derived from a reactant comprising a diglycidyl ether component, a difunctional active hydrogen containing component and a hydrophobic component.

The diglycidyl ether component can be represented by Formula (I) or Formula (II) shown as follows:

where A is a substituted or unsubstituted alkyl, alkylene, alkenyl, aryl, alkylaryl, arylalkylene, arylalkenyl, alkoxylated, cyclic, cycloaliphatic, or polycyclic; and B is $CH_2OCH_2$.

Examples of the diglycidyl ether component can include, but are not limited to, those shown as follows.

p = 1-6

-continued q = 1-6

R = H or alkyl
n = 0-500
m = 1-3 ortho, meta, or para ortho, meta, or para
$R_1$ and $R_2$ = H or alkyl

More unlimited examples of the diglycidyl ether component can include those shown below.

Diglycidyl Ether (DGE)

Ethylene Glycol Diglycidyl Ether (EG DGE)

Diethylene Glycol Diglycidyl Ether (DEG DGE)

Poly(Ethylene Glycol) Diglycidyl Ether (PEG DGE)

n = 1-25

Poly(Propylene Glycol) Diglycidyl Ether (PPG DGE)

n = 1-25

Glycerol Diglycidyl Ether (Glycerol DGE)

1,4-Butanediol Diglycidyl Ether (1,4-Butanediol DGE)

1,4-Hexanediol Diglycidyl Ether (1,6-Hexanediol DGE)

Resorcinol Diglycidyl Ether (Resorcinol DGE)

Bisphenol F Diglycidyl Ether (Bisphenol F DGE)

Bisphenol A Diglycidyl Ether (Bisphenol A DGE)

The difunctional active hydrogen containing component comprises at least two functional groups of OH, SH and $NH_2$. The difunctional active hydrogen containing component can be represented by Formula (III) as shown below, X-D-X  Formula (III)

where X is OH, SH or NH$_2$ and D is alkyl, alkylene, alkenyl, aryl, alkylaryl, arylalkylene, arylalkenyl, cyclic, cycloaliphatic, polycyclic or alkoxylated moieties.

The difunctional active hydrogen containing component can also be represented in Formula (IV) as shown below, Formula (IV)

where X is OH, SH or NH$_2$, R is H or alkyl, n is an integer of 0 to 900 and m is an integer of 1 to 3.

The difunctional active hydrogen containing component can comprise a dihydric alcohol, a polyol or a polyetheramine.

In one non-limiting embodiment, the dihydric alcohol is selected from the group consisting of 1,4-, 1,3-, and 2,3-butylene glycol, cyclohexanedimethanol (1,4-bis-hydroxymethylcyclohexane), diethylene glycol, dipropylene glycol, dibutylene glycol, ethylene glycol, 1,2- and 1,3-propylene glycol, 1,6-hexanediol, 2-methyl-1,3-propanediol, neopentylglycol, 1,8-octanediol, polyethylene glycol, polypropylene glycol, polyethylene glycol-polypropylene glycol, polybutylene glycol, and polytetrahydrofuran.

Polyethylene glycol can include commercial products such as Polyethylene Glycol 200, Polyethylene Glycol 300, Polyethylene Glycol 400, Polyethylene Glycol 600, Polyethylene Glycol 1000, Polyethylene Glycol 1500, Polyethylene Glycol 3350, Polyethylene Glycol 4000, Polyethylene Glycol 6000, Polyethylene Glycol 8000; and Polyglykol 400, Polyglykol 600, Polyglykol 4000S, Polyglykol 8000S, Polyglykol 9000S, Polyglykol 20000S, Polyglykol 35000S that are commercially available from Clariant.

Examples of polypropylene glycol can include, but are not limited to, Poly(propylene glycol) 425, Poly(propylene glycol) 725, Poly(propylene glycol) 1000, Poly(propylene glycol) 2000, Poly(propylene glycol) 2700 and Poly(propylene glycol) 4000.

Examples of polyethylene glycol-polypropylene glycol can include Poly(ethylene glycol)-block-poly-(propylene glycol)-block-poly-(ethylene glycol) having M$_n$ 8400. Examples of polytetrahydrofuran can include Polytetrahydrofuran 250, Polytetrahydrofuran 650, Polytetrahydrofuran 1000, Polytetrahydrofuran 2000, and Polytetrahydrofuran 2900.

Other dihydric alcohols can include aminoethylpolyethylene glycol such as O-(2-Aminoethyl) polyethylene glycol 3000 and O-(2-Aminoethyl) polyethylene glycol 5000, and Poly(propylene glycol) bis(2-aminopropyl(ether)).

The polyetheramine can be dihydric polyetheramines containing primary amino groups attached to the end of a polyether backbone such as Jeffamine® polyetheramines. The polyether backbone is typically based on ethylene oxide (EO), propylene oxide (PO), and EO/PO mixtures.

Examples of Jeffamine® polyetheramines can include O-(2-Aminopropyl)-O-(2-methoxyethyl) polypropylene glycol 500, and O,O'-Bis(2-aminopropyl) polypropylene glycol-block-polyethylene glycol-block-polypropylene glycol; Jeffamine® THF 170, Jeffamine® D-230, Jeffamine® D-400, Jeffamine® D-2000, Jeffamine® D-4000, Jeffamine® HK-511, Jeffamine® ED-600, Jeffamine® ED-900, Jeffamine® ED-2003, Jeffamine® EDR-148, and Jeffamine® EDR-176, which are commercially available from Huntsman Corporation.

The polyol herein refers to a compound having three or more hydroxyl groups. Examples of the polyol used in the present disclosure can include, but are not limited to, Voranol™ Triol Polyether Polyols (commercially available from the DowDuPont Inc.); glycerin initiated, ethylene oxide triols including JEFFOL® G31-28 Polyol, JEFFOL® G31-35 Polyol and JEFFOL® G31-43 Polyol (commercially available from Huntsman Corporation); and glycerin initiated, propylene oxide triols including JEFFOL® FX31-167 Polyol, JEFFOL® FX31-240 Polyol and JEFFOL® G30-650 (commercially available from Huntsman Corporation).

The difunctional active hydrogen containing component can also comprise a polysaccharide or its derivatives. The polysaccharide and its derivatives are selected from a group consisting of cellulosics, chitins, chitosans, starches, galactomannans and their derivatives. In one non-limiting embodiment, the cellulose derivative is cellulose ether including hydroxyethyl cellulose, hydroxypropyl cellulose, methyl cellulose, methylhydroxyethyl cellulose, methylhydroxypropyl cellulose, and carboxymethyl cellulose.

In another non-limiting embodiment, guar derivatives can include, but are not limited to, carboxymethyl guar, carboxymethylhydroxypropyl guar, cationic hydroxypropyl guar, hydroxyalkyl guar such as hydroxyethyl guar, hydroxypropyl guar, and hydroxybutyl guar, carboxyalkyl guars such as carboxymethyl guar, carboxylpropyl guar, carboxybutyl guar, and the like.

In one non-limiting embodiment, the hydrophobic component can be represented by Formula (V) as shown below, Y-E-F    Formula (V)

where Y is OH, SH or NH$_2$; E is an alkoxylated moiety of $[(CH_2)_mCH(R)O]_n$; F is substituted or unsubstituted alkyl, alkylene, alkenyl, aryl, arylalkylene, arylalkenyl, cyclic, cycloaliphatic or polycyclic; R is H or alkyl; n is an integer of 0 to 100; and m is an integer of 1 to 3.

The hydrophobic component can be alkoxylated substituted or unsubstituted, pure or mixed cut alkyl, alkylene, alkenyl, aryl, alkylaryl, arylalkylene, arylalkenyl, cyclic, cycloaliphatic, and polycyclic alcohols. Examples of such hydrophobic components can include tristyrylphenol-polyglycolether commercially available as Emulsogen TS100 from Clariant; C12 ethoxylate commercially available as Novel 12-10 ethoxylate from Sasol; C16 ethoxylate commercially available as Novel 16-10 ethoxylate from Sasol; C16 ethoxylate commercially available as Alkonat C 200 from Oxiteno; C16/C18 ethoxylate commercially available as Genapol 0100 from Clariant; C18 ethoxylate commercially available as Genapol HS200 from Clariant or as Novel 18-20 ethoxylate from Sasol; and C22 ethoxylate commercially available as Novel 22-25 ethoxylate from Sasol.

The hydrophobic component can also include polyalkylene glycol monomethacrylates, alcohols, amines and thiols. Examples of polyalkylene glycol monomethacrylates can include Polyglykol MA 350 and Polyglykol MA 750, which are commercially available from Clariant. Examples of alcohols can include, but are not limited to, octyl alcohol, decyl alcohol, lauryl alcohol, cetyl alcohol, and stearyl alcohol. Examples of amines can include, but are not limited to, octylamine, decylamine, dodecylamine, hexadecylamine, and octadecylamine. Examples of thiols can include, but are not limited to, 1-octanethiol, 1-decanethiol, 1-dodecanethiol, 1-hexadecanethiol, and 1-octadecanethiol.

In another non-limiting embodiment, the hydrophobic component can be represented by Formula (VI), $$Z-G \quad \text{Formula (VI)}$$

where Z is Br, Cl, I, F, tosylate, or $(CH_2CHO)CH_2O$; and G is substituted or unsubstituted alkyl, alkylene, alkenyl, aryl, arylalkylene, arylalkenyl, cyclic, cycloaliphatic or polycyclic. In one non-limiting embodiment, G can be alkoxylated substituted alkyl, alkylene, alkenyl, aryl, arylalkylene, arylalkenyl, cyclic, cycloaliphatic or polycyclic. The hydrophobic component can be alkyl halides and monoepoxides. Examples of alkyl halides can include, but are not limited to, 1-bromobutane, 1-bromohexane, 1-bromoheptane, 1-bromooctane, 1-bromodecane, 1-bromododecane, 1-bromotetradecane, 1-bromohexadecane, 1-bromooctadecane, and 1-bromodocosane. Examples of monoepoxides can include, but are not limited to, allylglycidyl ether (AGE), 2-Ethylhexylglycidyl ether (EHGE), hexadecylglycidyl ether (HAGE-13, commercially available from Sachem), Oxirane [(Docosyloxy), methyl] (HAGE-22, commercially available from Sachem), naphthylglycidyl ether (NGE), n-butylglycidyl ether (n-BGE), iso-Butylglycidyl ether (iso-BGE), and Cardura™ E10P glycidyl ether and glycidyl ester of Versatic™ acid 10 (Hexion).

A weight average molecular weight of the reaction product can be in a range of from about 4,000 to about 100,000 Daltons, or from about 6,000 to about 70,000 Daltons, or from about 6,000 to about 45,000 Daltons, or from about 8,000 to about 20,000 Daltons.

A hydrophobic group of the reaction product can comprise from about 0.5 to about 20 wt %, or from about 0.75 to about 15 wt %, or from about 0.75 to about 10 wt %, or from about 1 to about 7 wt % based on the total weight of the reaction product.

The reaction product of the present disclosure may contain the difunctional active hydrogen containing component that is not reacted. The unreacted difunctional active hydrogen containing component can be varied in a range of 0 to about 27 wt %, or from about 0.10 to about 25 wt %, or from about 0.20 to about 20 wt % based on the total weight of the reaction product. In one non-limiting embodiment, the unreacted difunctional active hydrogen containing component is unreacted polyethylene glycol.

The reaction product of the present disclosure can be used as a thickener in coatings. The use of a diglycidyl ether component as a reactant has created advantages in designing a thickener to achieve a wide variety of performance targets. For example, a balance of hydrophilic and hydrophobic functionalities can be controlled based on the specific requirement of the thickener. In addition, the types of hydrophobic groups and their amounts can be independently selected and different from the chain extensions of the polymer.

The present disclosure is also directed to a method for preparing the reaction product described above. The method comprises reacting a diglycidyl ether component with a difunctional active hydrogen containing component and a hydrophobic component in the presence of an alkali hydroxide. The difunctional active hydrogen containing component can be dried under vacuum to remove water. The alkali hydroxide can be sodium hydroxide, and/or potassium hydroxide.

In one non-limiting embodiment, the method comprises:
(1) molten mixing a difunctional active hydrogen containing component and an alkali hydroxide to form a first reaction mixture, optionally, water can be removed;
(2) adding water into the first reaction mixture to dissolve the molten alkali hydroxide to form a second reaction mixture;
(3) adding a diglycidyl ether component into the second reaction mixture to form a third reaction mixture; and
(4) adjusting a temperature of the third reaction mixture to carry out the reactions; and
(5) adding a hydrophobic component and further carrying out the reaction to provide the reaction product.

The temperature of the steps (4) and (5) can be adjusted in a range of about 60 to 150° C., or about 90 to about 130° C., and reacting time in the steps (4) and (5) can last from about 1 to about 180 minutes, or about 1 to about 120 minutes, or about 1 to about 60 minutes.

In another non-limiting embodiment, the method comprises:
(1) molten mixing a difunctional active hydrogen containing component, a hydrophobic component and an alkali hydroxide to form a first mixture, optionally water can be removed;
(2) adding water to the first mixture to dissolve the molten alkali hydroxide to form a second mixture; and
(3) reacting a diglycidyl ether component with the second mixture to provide the product.

The reaction temperature of the step (3) can be adjusted in a range of about 60 to 150° C., or about 90 to about 130° C., and reacting time in the step (3) can last from about 1 to about 180 minutes, or about 1 to about 120 minutes, or about 1 to about 60 minutes.

In yet another non-limiting embodiment, the method comprises:
(1) molten mixing a difunctional active hydrogen containing component and an alkali hydroxide to form a first mixture, optionally water can be removed;
(2) adding a hydrophobic component into the first mixture;
(3) adding water to the first mixture to dissolve the molten alkali hydroxide to form a second mixture; and
(4) reacting a diglycidyl ether component with the second mixture to provide the product.

The reaction temperatures of the step (4) can be varied from about 60 to 150° C., or about 80 to about 130° C., and reacting time in the step (4) can be last from about 1 to about 180 minutes, or about 1 to about 120 minutes, or about 1 to about 60 minutes.

The present disclosure also relates to an aqueous protective coating composition comprising the reaction product described previously. The aqueous protective coating composition can further comprise a latex polymer. The latex polymers can be made by polymerization of various ethylenically unsaturated monomers, such as ethylene, vinyl, and acrylic monomers. Oftentimes, the latex polymers are made by copolymerizing more than one monomer to achieve several desired properties, particularly for applications in latex paints with very little or no volatile organic compounds (VOCs).

Examples of the latex polymers used in the aqueous protective coating composition can include, but are not limited to, homo- or co-polymers of vinyl acetate, methacrylic acid, methylacrylate, methylmethacrylate, ethylacrylate, butyl acrylate, styrene, ethylene, vinyl chloride, vinyl ester of versatic acid (VeoVa), vinyl propionate, butadiene, acrylonitrile, maleates, and fumarates. In one non-limiting embodiment, the latex polymer is selected from the group consisting of acrylics, vinyl-acrylics and styrene-acrylics.

Other latex polymers can include, but are not limited to, alkyds, cellulosics (cellulose nitrate and cellulose esters), coumarone-indenes, epoxies, esters, hydrocarbons, melamines, natural resins, oleo resins, phenolics, polyamides, polyesters, rosins, silicones, terpenes, ureas, urethanes, vinyls, and the like.

The aqueous protective coating composition can further comprise a pigment, a coalescent, a solvent, a wetting agent, a defoamer, a matting agent, a dispersant, a thickener, a biocide, a mildewcide, and a surfactant. The aqueous protective coating composition may optionally contain other components such as those generally used in coatings. Typical components include, but are not limited to, fillers, dryers, flattening agents, plasticizers, stabilizers, viscosifiers, suspension agents, flow control agents, anti-skinning agents, extenders, film formation aids, cross-linkers, surface improvers, corrosion inhibitors, leveling aids, surface improvers, humectants/wet-edge agents (e.g., ethylene glycol, propylene glycol, and hexylene glycol), pH modifiers, and their combinations thereof.

Specific examples of the pigments can include, but are not limited to, carbazole dioxazine crude pigment; azo, monoazo, disazo, naphthol AS, and benzimidazolone condensation; metal complex; isoindolinone; isoindoline; polycyclic phthalocyanine; quinacridone; perylene; perinone; diketopyrrolo pyrrole; thioindigo; anthraquinone; indanthrone; anthrapyrimidine; flavanthrone; pyranthrone; anthanthrone; dioxazine; triarylcarbonium; quinophthalone pigments; diketo pyrrolo pyrrole red ("DPPBO red"); titanium dioxide; carbon black; barium sulfate; calcium silicate; zinc oxide; magnesium aluminum silicate; precipitated calcium carbonate; ground calcium carbonate; kaolin; talc, clay; barium sulfate; glass beads; calcium sulfate; barium sulfate: zinc sulfide, zinc carbonate; satin white; aluminum silicate; diatomaceous earth; magnesium silicate; synthetic amorphous silica, colloidal silica, colloidal alumina; fumed alumina: fumed silica; pseudo-boehmite; aluminum hydroxide, alumina; modified alumina; mica, lithopone; zeolite; hydrated halloysite; magnesium carbonate; magnesium hydroxide; lampblack, black iron oxide; nepeline syenite; red iron oxide; yellow iron oxide; brown iron oxide (a blend of red and yellow oxide with black); phthalocyanine green; phthalocyanine blue; organic reds (such as naphthol red, quinacridone red and toulidine red); quinacridone magenta, quinacridone violet; DNA orange; and/or organic yellows (such as Hansa yellow). Oftentimes, titanium dioxide grades used in the aqueous protective coating composition are surface modified with various inorganic oxides, such as silicates, aluminates, and zirconates.

The amount of the reaction product used in the aqueous protective coating composition of the present disclosure is the amount effective in providing the desired thickening and rheological properties to the coating composition. In one non-limiting embodiment, the reaction product can be used in a range of about 0.1 to about 5 wt %, or in a range of about 0.1 to about 3 wt %, or from about 0.2 to about 3 wt %, or from about 1 wt % to about 3 wt % of the total aqueous protective composition.

The following examples illustrate the present disclosure, parts and percentages being by weight, unless otherwise indicated. Each example is provided by way of explanation of the present disclosure, not limitation of the present disclosure. In fact, it will be apparent to those skilled in the art that various modifications and variations can be made in the present disclosure without departing from the scope or spirit of the invention. For instance, features illustrated or described as part of one embodiment, can be used on another embodiment to yield a still further embodiment. Thus, it is intended that the present disclosure covers such modifications and variations as come within the scope of the appended claims and their equivalents

EXAMPLES

Solid Polymer Preparation

In the examples, the following abbreviations are used:

PEG: Polyethylene glycol with approximate $M_n$=8,270 and $M_w$=8,600

DGE: Diglycidyl ether

EG DGE: Ethylene glycol diglycidyl ether

DEG DGE: Diethylene glycol diglycidyl ether

PEG DGE: Poly(ethylene glycol) diglycidyl ether approximate $M_n$=500

PPG DGE: Poly(propylene glycol) diglycidyl ether approximate $M_n$=460

C8Br: 1-Bromooctane

C12Br: 1-Bromododecane

C16Br: 1-Bromohexadecane

EHGE: 2-[[(2-Ethylhexyl)oxy]methyl]-oxirane $M_w$: Weight-average molecular weight $M_n$: Number-average molecular weight $M_z$: Z-average molecular weight

Example 1: C12 (PEG DGE) PEG Polymer A

A reactor was charged with 1350 g PEG and 55.50 g NaOH. The contents of the reactor were mixed for 40 minutes under vacuum of 29 in. Hg while the temperature was adjusted to 91° C. The vacuum was turned off and the temperature was maintained at 91° C., 2.04 g water was added, and the contents of the reactor were mixed for 10 minutes. At 91° C., 31.21 g PEG DGE was added over 35 minutes. From the beginning of the PEG DGE addition, the contents of the reactor were mixed for 95 minutes while the temperature was adjusted to 120° C. 85.12 g C12Br was added at 120° C. in one portion. Once the C12Br addition was complete, the contents of the reactor were mixed for 105 minutes at 120° C. Then the contents of the reactor were discharged and allowed to cool to 20-25° C. to give solid Polymer A.

Example 2: C12 (PEG DGE) PEG Polymer B

A reactor was charged with 1350 g PEG and 55.50 g NaOH. The contents of the reactor were mixed for 45 minutes under vacuum of 29 in. Hg while the temperature was adjusted to 91° C. The vacuum was turned off and the temperature was maintained at 91° C., 2.04 g water was added, and the contents of the reactor were mixed for 20 minutes. At 91° C., 58.40 g PEG DGE was added over 35 minutes. From the beginning of the PEG DGE addition, the contents of the reactor were mixed for 100 minutes while the temperature was adjusted to 120° C. 84.20 g C12Br was added at 120° C. in one portion. Once the C12Br addition was complete, the contents of the reactor were mixed for 135 minutes. Half of the contents were discharged, and the remaining half of the contents of the reactor were mixed under vacuum of 29 in. Hg for 60 minutes at 120° C. The contents were discharged and allowed to cool to 20-25° C. to give solid Polymer B.

Example 3: C12 (EG DGE) PEG Polymer C

A reactor was charged with 1350 g PEG and 55.50 g NaOH. The contents of the reactor were mixed for 40 minutes under vacuum of 29 in. Hg while the temperature was adjusted to 91° C. The vacuum was turned off and the temperature was maintained at 91° C., 2.04 g water was added, and the contents of the reactor were mixed for 10 minutes. At 91° C., 11.50 g EG DGE was added over 30 minutes. From the beginning of the EG DGE addition, the contents of the reactor were mixed for 95 minutes while the temperature was adjusted to 120° C. 89.60 g C12Br was added at 120° C. in one portion. Once the C12Br addition was complete, the contents of the reactor were mixed for 95 minutes at 120° C. The contents were discharged and allowed to cool to 20-25° C. to give solid Polymer C.

Examples 4—C8 C12 PPG DGE PEG Polymer D

A reactor was charged with 1350 g PEG and 55.50 g NaOH. The contents of the reactor were mixed for 40 minutes under vacuum of 29 in. Hg while the temperature was adjusted to 90° C. The vacuum was turned off and the temperature was maintained at 90° C., 2.04 g water was added, and the contents of the reactor were mixed for 15 minutes. At 90° C., 40.50 g PPG DGE was added over 35 minutes. From the beginning of the PPG DGE addition, the contents of the reactor were mixed for 90 minutes while the temperature was adjusted to 120° C. 80.00 g C12Br and 30.00 g C8Br were added at 120° C. in one portion. Once the C12Br and C8Br additions were complete, the contents of the reactor were mixed for 90 minutes at 120° C. The contents were discharged and allowed to cool to 20-25° C. to give solid Polymer D.

Example 5—C12 PPG DGE PEG Polymer E

A reactor was charged with 1350 g PEG and 45.70 g NaOH. The contents of the reactor were mixed for 55 minutes under vacuum of 29 in. Hg while adjusting the temperature to 91° C. The vacuum was turned off and the temperature was maintained at 91° C., 2.04 g water was added, and the contents of the reactor were mixed for 15 minutes. At 90° C., 28.50 g PPG DGE was added over 30 minutes while adjusting the temperature to 120° C. From the beginning of the PPG DGE addition, the contents of the reactor were mixed for 90 minutes. 130.00 g C12Br was added in one portion at 120° C. Once the C12Br addition was complete, the contents of the reactor were mixed for 90 minutes at 120° C. The contents of the reactor were discharged and allowed to cool to 20-25° C. to give solid Polymer E.

Example 6: C16 (PEG DGE) PEG Polymer F

A reactor was charged with 1350 g PEG and 45.70 g NaOH. The contents of the reactor were mixed for 40 minutes under vacuum of 29 in. Hg while the temperature was adjusted to 90° C. The vacuum was turned off and the temperature was maintained at 90° C., 2.04 g water was added, and the contents of the reactor were mixed for 15 minutes. At 90° C., 27.92 g PEG DGE was added over 30 minutes. From the beginning of the PEG DGE addition, the contents of the reactor were mixed for 90 minutes while the temperature was adjusted to 120° C. 190.00 g C16Br was added at 120° C. in one portion. Once the C16Br addition was complete, the contents of the reactor were mixed for 90 minutes at 120° C. The contents were discharged and allowed to cool to 20-25° C. to give solid polymer F.

Example 7—EHGE DGE PEG Polymer G

A reactor was charged with 1350 g PEG and 77.90 g KOH. The contents of the reactor were mixed for 70 minutes under vacuum of 29 in. Hg while the temperature was adjusted to 91° C. The vacuum was turned off and the temperature was maintained at 91° C., 5.00 g water was added, and the contents of the reactor were mixed for 40 minutes. At 91° C., 27.92 g PEG DGE was added over 30 minutes while adjusting the temperature to 130° C. 100.00 g EHGE was added 60 minutes at 130° C. Once the EHGE addition was complete, the contents of the reactor were mixed for 125 minutes at 130° C. The contents of the reactor were discharged and allowed to cool to 20-25° C. to give solid Polymer G.

Characterization of Solid Polymers

NMR Analysis

Sample Preparation—Approximately 1.0 mg of tetrachloro nitrobenzene (TCNB) and approximately 5.0 mg of solid polymer sample were weighed into a 1.0 mL vial. 0.7 gm of $CDCl_3$ was added into the vial. The vial was loaded into a shaker and the shaker was operated for 30 minutes. The resultant solution was transferred into a 5 mm NMR tube for analysis.

NMR Measurement—Quantitative $^1H$ NMR spectrum was recorded using Bruker 400 MHz NMR spectrometer. Measurement parameters were as follows: temperature 300K, sweep width 20 ppm, pulse width 45 deg, number of scans 32, and relaxation delay 25s. Processing parameters were as follows: line broadening 0.3 Hz. Spectrum was phase and baseline was corrected using standard practice. Down-field signal of residual $CHCl_3$ from solvent $CDCl_3$ was referenced to 7.24 ppm.

Quantitative NMR Calculation—The weight % of the attached hydrophobes was calculated from the integral of the —$CH_2$ proton that were β from the ether oxygen (—O—$CH_2$—$CH_2$—$(CH_2)_n$—$CH_3$, δ 1.47-1.61 ppm). The integral contribution to this peak from byproducts such as alcohol and olefin was subtracted out. The calculation was conducted based on the quantitative NMR procedure, which is described in the following references: Peterson, J. $^1H$ NMR *analysis of mixtures using internal standards: A quantitative experiment for the instrumental analysis laboratory*, J. Chem. Educ., 1992, 69, 843-845; and Bharti, S. K. and Roy, R. *Quantitative $^1H$ NMR spectroscopy*, Trends in Analytical Chemistry, 2012, 35, 5-26 each publication of which is herein incorporated in its entirety by reference.

High Pressure Liquid Chromatography (HPLC) Measurement:

The amounts of PEG in the solid polymer samples were measured using HPLC with evaporative light scattering detection (ELSD). Table 1 lists the instrument and operating parameters.

TABLE 1

| Instrument and Operating Parameters | |
| --- | --- |
| Instrument | Agilent 1200 Series HPLC System with G1311A quaternary pump, G1322A degasser, G1315B diode array detector, G1329A autosampler, G1316A thermostatted column compartment, G7102A 1290 Infinity II Evaporative Light Scattering Detector (ELSD) and OpenLAB software |
| Column | YMC-Pack Ph, 50 × 4.0 mm, 3 μm, Part No. PH12S03-0504WT |
| Column Oven | 40° C. |
| Injection Volume | 10 μL |

TABLE 1-continued

| | |
|---|---|
| Flow Rate | 0.5 mL/min |
| ELSD Settings | Nitrogen gas flow: 1.8 L/min |
| | Nebulizer temperature: 90° C. |
| | Evaporator temperature: 80° C. |
| Mobile Phase A | Acetonitrile |
| Mobile Phase B | Water |

| Gradient | | |
|---|---|---|
| Time (minutes) | % Phase A | % Phase B |
| 0 | 30 | 70 |
| 40 | 50 | 50 |
| 45 | 100 | 0 |
| 60 | 100 | 0 |
| Post (20 minutes) | 30 | 70 |

Figure 1:
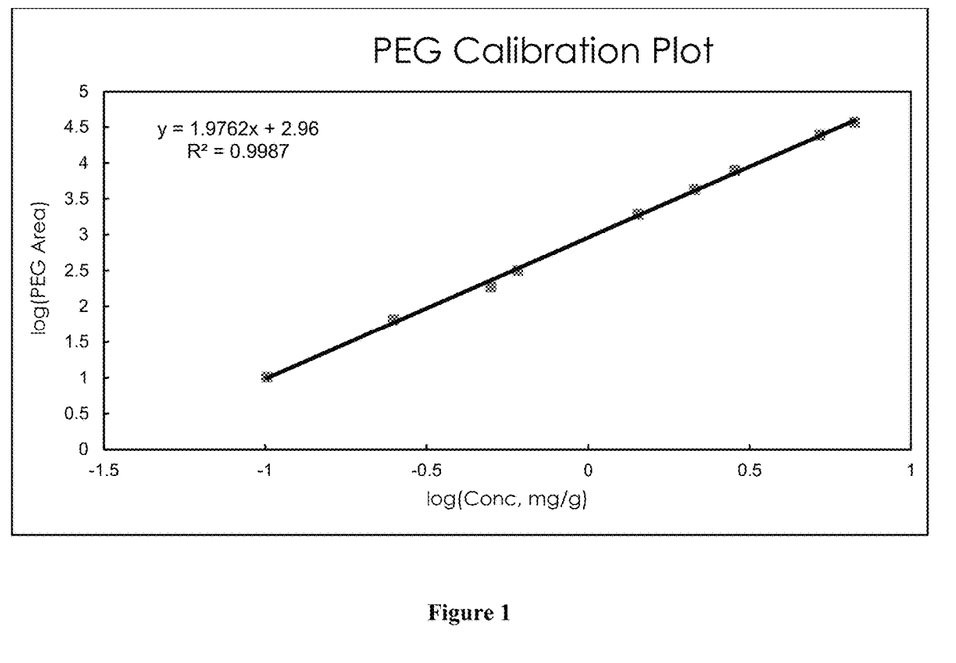
FIG. 1 is a PEG standard calibration curve for measuring the unreacted PEG for a solid polymer.

Preparation of the Standard:

PEG standard solutions (mg PEG/g solution) were prepared by accurately weighing the standard reference PEG to the nearest 0.01 mg into a tared vial. HPLC methanol and 2 drops of concentrated phosphoric acid were added, and the vial weighed again. The samples were vortexed and/or gently heated (~50° C.) until in solution. A log-log plot was used for the calibration curve as an ELSD is a nonlinear detector. The calibration curve is shown in FIG. 1.

Sample Preparation and Measurement:

Solid polymer samples were prepared in duplicate by accurately weighing ~100 mg of polymer sample to the nearest 0.01 mg into a tared vial. HPLC methanol (nominally 10 mL) and 2 drops of concentrated phosphoric acid were added, and the vial weighed again. The samples were vortexed and/or gently heated (~50° C.) until in solution. The PEG weight percentage was calculated from the calibration curve.

Size Exclusion Chromatography (SEC) Measurement

SEC was used for measuring apparent molecular weight distributions of the solid polymer. Alliance™ HPLC System and Empower™ Chromatography Data System, commercially available from the Waters Corporation (Milford, MA) were used to measure the apparent molecular weights. The apparent weight average molecular weights were calculated from the poly(ethylene glycol/ethylene oxide) (PEG/PEO) standard calibration curve with narrow molecular weight distributions.

Figure 2:
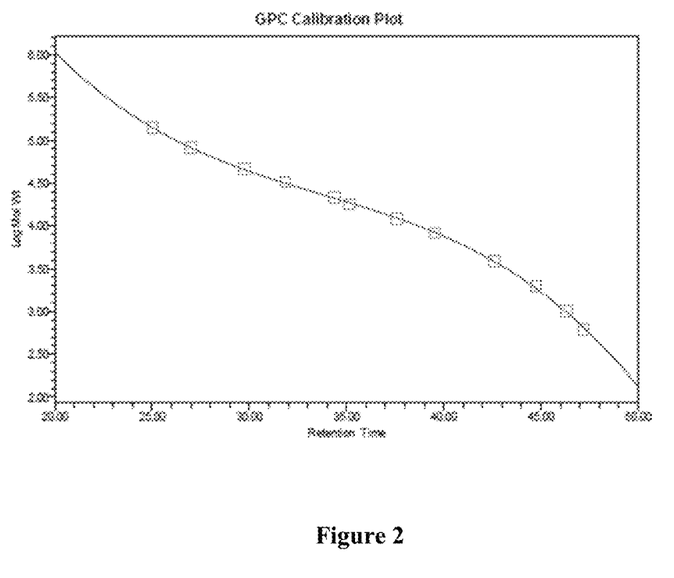
FIG. 2 is a PEG/PEO standard calibration curve for determining an apparent weight average molecular weight of a solid polymer.

Apparatus Set-up—All Waters modules in the set-up included:
Waters M515 solvent delivery system
Waters M2707 autosampler
Waters M2414 differential refractive index detector (DRI) for the relative SEC
Waters Empower™ 3 software
RI range 1.00 to 1.75 RIU
Measurement range $7 \times 10^{-7}$ RIU
Drift—$2 \times 10^{-7}$ RIU Analysis Conditions for SEC is described as follows:
Mobile Phase—70% Methanol/30% 0.6M Lithium acetate (pH 4.8) (w/w)
Flow Rate—0.5 ml/min
Columns—1 Shodex KW-804 Protein columns (8 mm×300 mm)+1 Shodex KW-803
Protein columns (8 mm×300 mm) in series (Showa Denko America, Inc., 420 Lexington Avenue, Suite 2335A, New York, NY 10170, USA)
Column Temperature 40° C.
DRI (differential refractive index) Detector Temperature 40° C.
Calibration—The PEO/PEG standard calibration curve with narrow molecular weight distributions was prepared based on Agilent PEG Calibration Kit and Agilent PEO Calibration Kit, commercially available from Agilent Technologies. The calibration curve is shown in FIG. 2.
Sample Concentration—1.5 mg/ml—dissolved directly into mobile phase
Injection volume—100 µl Table 2 list the polymer characterization data of solid polymers A-G. The weight percentage of EHGE in Table 2 included both free and grafted EHGE.

TABLE 2

Solid Polymer Characterization Data

| Solid Polymer | SEC | | | NMR | | | | HPLC |
|---|---|---|---|---|---|---|---|---|
| | $M_n$ | $M_w$ | $M_z$ | C12 (Wt %) | C16 (Wt %) | C8 (Wt %) | EHGE (Wt %) | Unreacted PEG (Wt %) |
| A | 11,000 | 15,900 | 25,500 | 2.38 | | | | 9.33 |
| B | 15,200 | 39,100 | 97,800 | 2.23 | | | | 12.02 |
| C | 10,200 | 13,200 | 18,300 | 2.29 | | | | 7.92 |
| D | 10,800 | 13,800 | 19,000 | 1.80 | | 0.72 | | 1.19 |
| E | 10,100 | 12,300 | 16,200 | 3.28 | | | | 0.52 |
| F | 10,900 | 13,900 | 19,300 | | 4.82 | | | 0.96 |
| G | 7,650 | 9,900 | 12,200 | | | | 6.67 | 2.94 |

Aqueous Polymer Solutions

Aqueous polymer solutions having 20 wt % of solid polymers were prepared by neutralizing the solid polymers obtained from Examples 1-7 in water using acetic acid. 0.50 wt % of Acticide MBS® biocide (a mixture of 1,2-benzisothiazolin-3-one (2.5%) and 2-methyl-4-isothiazolin-3-one (2.5%), commercially available from Thor Group Limited) was added to each solution after neutralization. Beta cyclodextrin or methyl beta cyclodextrin was added as a viscosity suppressant in some polymer solutions. Viscosity of polymer solutions having 20 wt % of solid polymer was measured using Brookfield Viscometer with LV spindles #4 at 30 rpm and 25° C. except for Polymer Solution 7. Table 3 list the amounts of some ingredients for the polymer solutions and their Brookfield viscosity.

TABLE 3

Polymer Characterization Data

| Polymer Solution | Solid Polymer | SAG 47 (Wt %) | Beta Cyclodextrin (Wt %) | Methyl Beta Cyclodextrin (Wt %) | Brookfield Viscosity (mPa · s) |
|---|---|---|---|---|---|
| 1 | A | 0.08 | — | — | 2,280 |
| 2 | B | 0.08 | 1.25 | — | 1,740 |
| 3 | C | 0.08 | — | — | 2,060 |
| 4 | D | 0.04 | — | — | 3,140 |
| 5 | E | 0.08 | 2.00 | — | 3,360 |
| 6 | F | 0.08 | — | 4.00 | 8,460 |
| 7 | G | — | — | — | 716* |

*Brookfield viscosity was measured using LV spindle #3.

Coating Applications

A base paint was prepared by mixing a grind formulation in Table 4A and letdown formulation in Table 4B, respectively.

TABLE 4A

Grind Formulation

| Generic Name/Trade Name | Amount Lbs | Amount Gal |
|---|---|---|
| Water | 151.20 | 18.15 |
| Nuosept ™ IM 498G | 0.21 | 0.13 |
| Ammonium Hydroxide (28%) | 1.50 | 0.17 |
| Tamol ™ M 731A | 8.00 | 0.87 |
| Dextrol ™ M OC-180 HS | 2.00 | 0.22 |
| Drewplus ™ T-4304 | 3.00 | 0.38 |
| Strodex ™ PK-95G | 2.00 | 0.22 |
| Ti-Pure ™ R-706 | 250.00 | 7.51 |
| Minex ® 7 | 15.00 | 0.69 |
| Min-U-gel ® 400 | 1.75 | 0.06 |

Nuosept ™ 498G: 1,2-benzisothiazolin-3-one, commercially available from Ashland Inc.
Tamol ™ 731A: Sodium salt of a maleic anhydride copolymer, commercially available from The Dow Chemical Company.
Dextrol ™ OC-180 HS: Neutralized (potassium salt) form of an ethoxylated aliphatic alcohol phosphate ester, commercially available from Ashland Inc.
Drewplus ™ T-4304: A defoamer, commercially available from Ashland Inc.
Strodex ™ PK-95G: Neutralized (potassium salt) form of a phosphate coester of aliphatic alcohols, commercially available from Ashland Inc.
Ti-Pure ™ R-706: Titanium dioxide, commercially available from Chemours Titanium Technologies.
Minex ® 7: Micronized functional filler having a median particle size of 3.5 microns, commercially available from The Cary Company.
Min-U-gel ® 400: A hydrous magnesium aluminum silicate, commercially available from Active Minerals International, LLC.

TABLE 4B

Letdown Formulation

| Generic Name/Trade Name | Amount Lbs | Amount Gal |
|---|---|---|
| Rhoplex ™ VSR-1050 | 500.00 | 56.56 |
| Optifilm ™ Enhancer 400 | 8.00 | 0.99 |
| Drewplus ™ T-4304 | 2.00 | 0.25 |
| Polyphase ® 678 | 3.00 | 0.31 |

Rhoplex ™ VSR-1050: Acrylic emulsion, commercially available from The Dow Chemical Company.
Optifilm ™ Enhancer 400: A coalescent, commercially available from Eastman Chemical Company.
Polyphase ® 678: A fungicide, commercially available from Troy Corporation.

Thickening Efficiency Measurement

Thickening efficiency was measured by adding 5.3 g of water and 2.0 g of the aqueous polymer solutions 1-6 listed in Table 3 into 66.4 g of the base paint obtained by mixing the formulations listed in Tables 4A and 4B. The thickening efficiency was measured by Brookfield Viscosity, Stormer Viscosity (KU) and ICI Viscosity as described below. The results are listed in Table 5.

Brookfield Viscosity was measured using a Brookfield viscometer with spindle #5 at 30 RPM and 25° C. It is expressed in mPa·s.

Stormer Viscosity was measured using a Stormer viscometer as per the standard test method ASTM D562. It is expressed in Kreb Units (KU).

ICI Viscosity was measured using an ICI cone and plate viscometer as per the standard test method ASTM D4287. It is expressed in mPa·s.

TABLE 5

Thickening Efficiency of Aqueous Polymer Solutions

| Polymer Solution | Brookfield Viscosity (mPa · s) | KU | ICI (mPa · s) |
|---|---|---|---|
| 1 | 720 | 70 | 64.8 |
| 2 | 707 | 69 | 66.7 |
| 3 | 853 | 72 | 56.3 |
| 4 | 2,027 | 86 | 66.7 |
| 5 | 8,707 | 126 | 118.5 |
| 6 | >20,000 | 174 | 9.0 |

Performance of Coatings

Aquaflow™ NLS220 (a solvent-free nonionic synthetic associative, commercially available from Ashland LLC) and each aqueous polymer solution having 20 wt % solid polymers listed in Table 3 along with water were added to the base paint. The dosages of Aquaflow™ NLS220, each polymer solution and water were adjusted to achieve a Stormer viscosity between 95 and 115 KU units and an ICI viscosity between 100 and 170 mPa·s for measuring the performance of the coatings described below. The results are listed in Table 6.

Sag Resistance was measured on a Leneta chart as per the standard test method ASTM D4400 using a mid-range bar. Wet film thickness (WFT) in mils above which sag occurs was measured.

Leveling was measured as per the standard test method ASTM D4062 on a scale of 0-10; 0=worst and 10=best.

Gloss was measured using a BYK Gardner Micro-Tri-Gloss meter as per ASTM D523. Gloss at 60° was reported.

Intrinsic Hide of the paints was recorded in terms of contrast ratio (CR) that was measured on a Leneta chart form #3B. Paint of 3 mil wet film thickness was applied on Leneta chart form #3B. Contrast ratio is the ratio of the reflectance of the surface of the dry paint film coated over a black substrate ($Y_b$) over a white substrate ($Y_w$). A higher contrast ratio indicates higher opacity and higher hiding power of paints.

TABLE 6

Paint Application Properties

| Polymer Solution | sag | level | Gloss 60° | Intrinsic hide |
|---|---|---|---|---|
| 1 | 8 | 9 | 45 | 0.981 |
| 2 | 10 | 9 | 45.5 | 0.979 |
| 3 | 8 | 9 | 46.4 | 0.979 |
| 4 | 8 | 9 | 50 | 0.977 |
| 5 | 10 | 9 | 46.9 | 0.979 |
| 6 | 10 | 9 | 45.8 | 0.979 |

What is claimed is:

1. A reaction product derived from a reactant comprising a diglycidyl ether component, a difunctional active hydrogen containing component and a hydrophobic component wherein the difunctional active hydrogen containing component comprises a dihydric alcohol, a polyol or a polyetheramine, wherein the dihydric alcohol is polyethylene glycol.

2. The reaction product of claim 1, wherein a weight average molecular weight of the reaction product is varied in a range of 4,000 to 100,000 Daltons.

3. The reaction product of claim 1, wherein the reaction product comprises 0.5 to 20 wt % of the hydrophobic group based on the total weight of the reaction product.

4. The reaction product of claim 1, an unreacted difunctional active hydrogen containing component comprises less than 27 wt % based on the total weight of the reaction product.

5. The reaction product of claim 4, wherein the unreacted difunctional active hydrogen containing component is unreacted polyethylene glycol.

6. A method for preparing the reaction product of claim 1, comprising:
   (1) molten mixing the difunctional active hydrogen containing component and an alkali hydroxide to form a first reaction mixture;
   (2) adding water into the first reaction mixture to dissolve the molten alkali hydroxide to form a second reaction mixture;
   (3) adding the diglycidyl ether component into the second reaction mixture to form a third reaction mixture;
   (4) adjusting a temperature of the third reaction mixture to be in a range of about 90 to about 130° C. and reacting for about 1 to about 60 minutes; and
   (5) adding the hydrophobic component and reacting for about 60 to about 120 minutes to provide the reaction product.

7. A method for preparing the reaction product of claim 1, comprising:
   (1) molten mixing the difunctional active hydrogen containing component, the hydrophobic component and an alkali hydroxide to form a reaction mixture;
   (2) adding water into the mixture to dissolve the molten alkali hydroxide to form a second reaction mixture; and
   (3) reacting the diglycidyl ether component with the second reaction mixture to provide the reaction product.

8. A method for preparing the reaction product of claim 1, comprising:
   (1) molten mixing the difunctional active hydrogen containing component and an alkali hydroxide to form a mixture;
   (2) adding the hydrophobic component into the mixture;
   (3) adding water into the mixture to dissolve the molten alkali hydroxide; and
   (4) reacting the diglycidyl ether component with the mixture to provide the reaction product.

9. The method of claim 6, wherein the alkali hydroxide is sodium hydroxide or potassium hydroxide.

10. A method of using the reaction product of claim 1 as a rheology modifier.

11. An aqueous protective coating composition comprising the reaction product of claim 1.

12. The aqueous protective coating composition of claim 11, further comprising a latex polymer.

13. The aqueous protective coating composition of claim 12, wherein the latex polymer is selected from the group consisting of vinyl acetate ethylene, acrylics, vinyl-acrylics and styrene-acrylics polymers.

14. The aqueous protective coating composition of claim 11, further comprising a pigment.

15. The aqueous protective coating composition of claim 14, wherein the pigment is selected from the group consisting of hydrated aluminum oxide, barium sulfate, calcium silicate, clay, silica, talc, titanium dioxide, zinc oxide, and mixtures thereof.

16. The aqueous protective coating composition of claim 11, further comprising one or more of a coalescent, a solvent, a wetting agent, a defoamer, a matting agent, a dispersant, a thickener, a biocide, a mildewcide, and a surfactant.

17. The aqueous protecting coating composition of claim 11, comprising from about 0.5 wt % to about 4 wt % of the reaction product of claim 1.

18. The aqueous protective coating composition of claim 11, wherein the aqueous protective composition comprises a paint.

19. A reaction product derived from a reactant comprising a diglycidyl ether component, a difunctional active hydrogen containing component and a hydrophobic component wherein the difunctional active hydrogen containing component comprises a dihydric alcohol, a polyol or a polyetheramine, wherein the polyol is a polysaccharide or its derivatives.

20. The reaction product of claim 19, wherein the polysaccharide and its derivatives are selected from a group consisting of cellulosics, chitins, chitosans, starches, galactomannans and their derivatives.

21. A reaction product derived from a reactant comprising a diglycidyl ether component, a difunctional active hydrogen containing component and a hydrophobic component wherein the difunctional active hydrogen containing component comprises a dihydric alcohol, a polyol or a polyetheramine, wherein the hydrophobic component has the following general Formula (V):

$$Y\text{-}E\text{-}F \qquad \text{Formula (V)}$$

where Y is OH, SH or $NH_2$; E is an alkoxylated moiety of $[(CH_2)_m CH(R)O]_n$; F is substituted or unsubstituted alkyl, alkylene, alkenyl, aryl, arylalkylene, arylalkenyl, cyclic, cycloaliphatic or polycyclic; R is H or alkyl; n is an integer of 1 to 100; and m is an integer of 1 to 3.

22. A reaction product derived from a reactant comprising a diglycidyl ether component, a difunctional active hydrogen containing component and a hydrophobic component wherein the difunctional active hydrogen containing component comprises a dihydric alcohol, a polyol or a polyetheramine, wherein the hydrophobic component has the following general Formula (VI):

$$Z\text{-}G \qquad \text{Formula (VI)}$$

where Z is Br, Cl, I, F, tosylate, or $(CH_2CHO)CH_2O$; and G is substituted or unsubstituted alkyl, alkylene, alkenyl, aryl, arylalkylene, arylalkenyl, cyclic, cycloaliphatic or polycyclic.

23. The reaction product of claim 22, wherein G is alkoxylated substituted alkyl, alkylene, alkenyl, aryl, arylalkylene, arylalkenyl, cyclic, cycloaliphatic or polycyclic.

* * * * *